United States Patent
Stauss-Reiner et al.

(10) Patent No.: US 10,583,547 B2
(45) Date of Patent: Mar. 10, 2020

(54) METHOD AND SYSTEM FOR CONTROLLING INJECTION PROCESSES

(71) Applicant: Hilti Aktiengesellschaft, Schaan (LI)

(72) Inventors: Peter Stauss-Reiner, Feldkirch (AT); Norbert Heeb, Buchs (CH); Tilo Dittrich, Feldkirch (AT)

(73) Assignee: HILTI AKTIENGESELLSCHAFT, Schaan (LI)

( * ) Notice: Subject to any disclaimer, the term of this patent is extended or adjusted under 35 U.S.C. 154(b) by 431 days.

(21) Appl. No.: 15/128,475

(22) PCT Filed: Mar. 31, 2015

(86) PCT No.: PCT/EP2015/056987
§ 371 (c)(1),
(2) Date: Sep. 23, 2016

(87) PCT Pub. No.: WO2015/150365
PCT Pub. Date: Oct. 8, 2015

(65) Prior Publication Data
US 2017/0106514 A1    Apr. 20, 2017

(30) Foreign Application Priority Data
Apr. 4, 2014  (EP) .................................. 14163608

(51) Int. Cl.
*B25C 1/08*    (2006.01)
*G05B 15/02*    (2006.01)

(52) U.S. Cl.
CPC ............... *B25C 1/08* (2013.01); *G05B 15/02* (2013.01)

(58) Field of Classification Search
None
See application file for complete search history.

(56) References Cited

U.S. PATENT DOCUMENTS 4,712,524 A * 12/1987 Smith .................... F02M 69/08
123/1 A
4,800,862 A * 1/1989 McKay .................. F02M 67/12
123/531

(Continued)

FOREIGN PATENT DOCUMENTS

DE    103 19 646 B3    9/2004
DE    103 19 647 B3    9/2004

(Continued)

OTHER PUBLICATIONS

International Bureau, International Search Report in International Patent Application No. PCT/EP2015/056987, dated Aug. 3, 2015.

(Continued)

*Primary Examiner* — Van H Nguyen
(74) *Attorney, Agent, or Firm* — Leydig Voit & Mayer, Ltd.

(57) ABSTRACT

A method and a system for controlling injection processes in liquid fuel-operated setting devices is provided wherein a time-controlled metering device supplies fuel from a fuel tank to a combustion chamber. In order to further improve control of injection processes in the liquid fuel-operated setting devices, a metering time interval of the time-controlled metering device is adapted to the age of the fuel tank.

19 Claims, 1 Drawing Sheet

(56) References Cited

U.S. PATENT DOCUMENTS

| | | | | |
|---|---|---|---|---|
| 5,996,337 | A * | 12/1999 | Blosser | F02D 41/0055 60/274 |
| 6,988,469 | B2 * | 1/2006 | Schiestl | B25C 1/08 123/46 SC |
| 7,004,147 | B2 * | 2/2006 | Kang | F02D 41/0027 123/479 |
| 7,278,396 | B2 * | 10/2007 | Leone | F01N 11/00 123/431 |
| 7,602,671 | B2 * | 10/2009 | Dionysiou | G01F 23/2962 367/112 |
| 8,694,186 | B2 * | 4/2014 | Syed | F02D 41/0025 701/22 |
| 8,928,473 | B2 * | 1/2015 | Gilchrist | B60K 15/04 340/425.5 |
| 9,494,102 | B2 * | 11/2016 | Strasser | F02D 41/3809 |
| 2002/0029770 | A1 * | 3/2002 | Heffel | F02B 43/00 123/527 |
| 2002/0078678 | A1 * | 6/2002 | Maillard | F02C 9/28 60/39.281 |
| 2004/0083711 | A1 * | 5/2004 | Hodinot | F02C 9/263 60/39.281 |
| 2004/0182337 | A1 * | 9/2004 | Schiestl | B25C 1/08 123/46 SC |
| 2005/0252945 | A1 | 11/2005 | Odoni et al. | |
| 2009/0200353 | A1 * | 8/2009 | Dittrich | B25C 1/08 227/9 |
| 2009/0250364 | A1 | 10/2009 | Gerold et al. | |
| 2010/0037961 | A1 * | 2/2010 | Tysver | G05D 7/0688 137/115.13 |
| 2011/0140877 | A1 * | 6/2011 | Gilchrist | B60K 15/04 340/450.2 |
| 2011/0180582 | A1 | 7/2011 | Cordeiro et al. | |
| 2011/0303726 | A1 | 12/2011 | Blessing et al. | |
| 2014/0008409 | A1 | 1/2014 | Ehmig et al. | |

FOREIGN PATENT DOCUMENTS

| | | |
|---|---|---|
| DE | 10 2008 000974 A1 | 10/2009 |
| EP | 2 368 669 A2 | 9/2011 |
| EP | 2 397 267 A2 | 12/2011 |
| WO | WO 02/39011 A1 | 5/2002 |

OTHER PUBLICATIONS

European Patent Office, European Search Report in European Patent Application No. 14163608.4, dated Oct. 16, 2014.

* cited by examiner

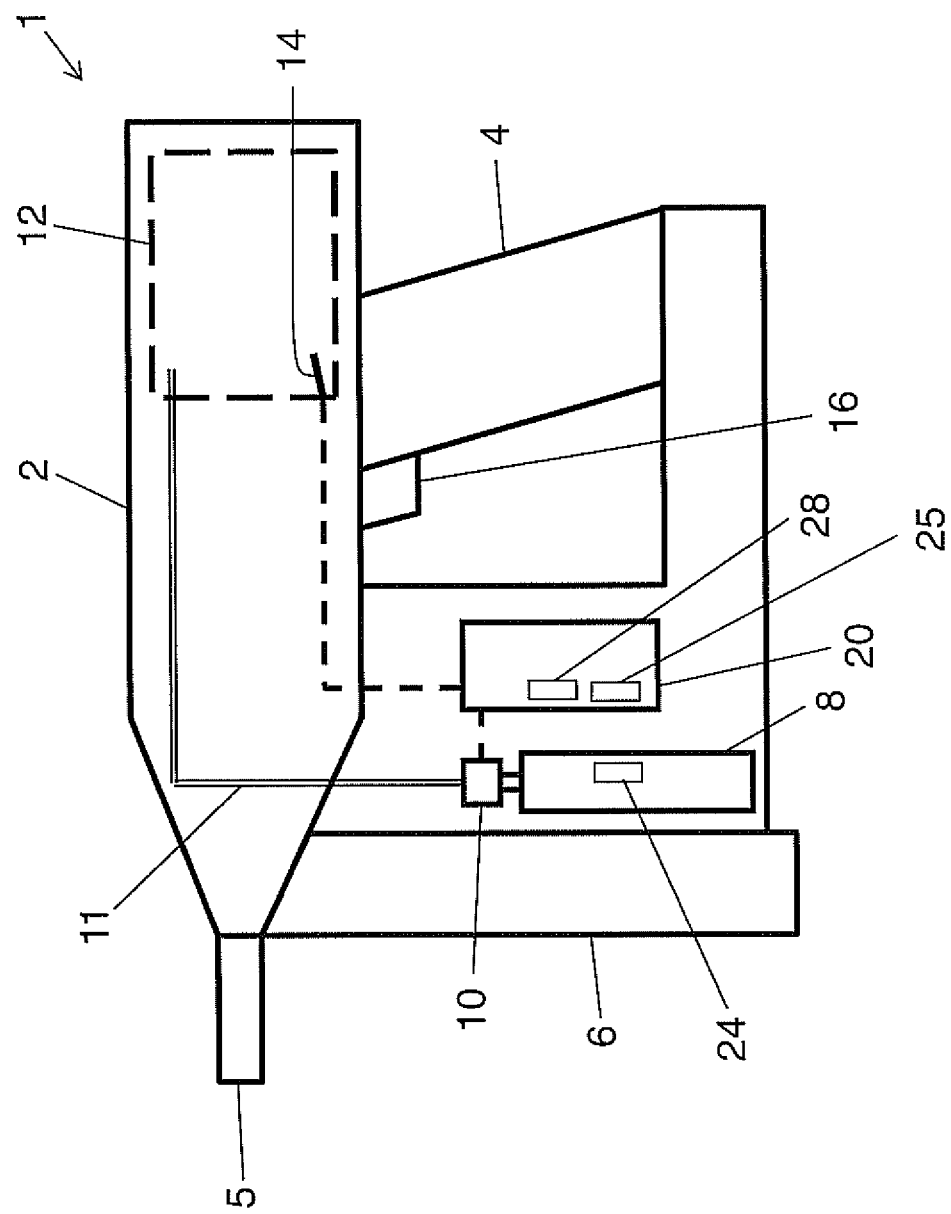

METHOD AND SYSTEM FOR CONTROLLING INJECTION PROCESSES

CROSS-REFERENCE TO RELATED APPLICATIONS

This patent application is the U.S. National Stage of International Patent Application No. PCT/EP2015/056987, filed Mar. 31, 2015, which claims the benefit of European Patent Application No. 14163608.4, filed Apr. 4, 2014, which are each incorporated by reference.

TECHNICAL FIELD

The invention relates to a method and a system for controlling injection processes in liquid fuel-operated setting devices which comprise a fuel tank from which fuel is supplied to a combustion chamber by means of a time-controlled metering device.

BACKGROUND OF THE INVENTION

A setting device is known from the European patent application EP 2 368 669 A2, in which the fuel requirement is determined as a function of a combustion chamber temperature, wherein a metering rate is determined as a function of a fuel tank temperature. The metering time is calculated from the metering rate and the fuel requirement by a control unit. The American Patent Application US 2011/0180582 A1 discloses a setting device with a pressure sensor by which the pressure in a fuel tank is determined. The fuel tank pressure is used in order to deduce the fuel tank filling level. German patent DE 103 19 646 B3 discloses a propellant tank for combustion power-operated setting devices with a housing and a housing interior to accommodate propellants, wherein a data memory identification unit, in which propellant filling level data can be recorded and can be read out, is arranged on the propellant tank.

BRIEF SUMMARY OF THE INVENTION

The object of the invention is to further improve the control of injection processes in liquid fuel-operated setting devices.

In a method for controlling injection processes in liquid fuel-operated setting devices which comprise a fuel tank from which fuel is supplied to a combustion chamber by means of a time-controlled metering device, this object is achieved in that a metering time of the time-controlled metering device is adapted to the age of the fuel tank. The fuel tank is preferably designed with double walls. In a so-called can-in-can system two tanks are arranged one inside the other. The inner tank serves to accommodate the fuel and enables high impermeability. In a likewise known bag system the internal tank is replaced by a bag, which is advantageous with regard to the production costs. However, in fuel tanks according to the bag system, due to diffusion processes through the bag wall or in the region of a weld seam of the bag a relatively great pressure drop takes place during storage. As a result the metered quantity is changed, which can lead to equipment faults during operation of the setting device with the fuel tank.

Due to the adaptation of the metering time to the age of the fuel tank, the pressure drop which occurs in particular in fuel tanks according to the bag system can be taken into account in a simple manner. In the context of the invention the age of the fuel tank should preferably be understood to be the time since the date of production, particularly preferably since the date of filling of the fuel tank. The metered quantity depends primarily upon the metering time, the fuel tank pressure and the fuel density, in particular the combustion gas density. The mass flow through the metering device depends primarily upon the fuel tank pressure. The metered quantity is determined by the time-limited opening of the metering device. The ambient temperature and the ambient pressure are, for example, taken into consideration in the determination of the necessary metering time. This information can be determined by means of suitable sensors. In the determination of the metering time it is generally assumed that the fuel tank has a constant fuel tank pressure at the same temperature. Due to the consideration of the age of the fuel tank according to the invention during determination of the metering time, the pressure drop which occurs in particular in fuel tanks according to the bag system can also be taken into account. As a result the setting quality can be improved. Furthermore, fuel tanks which are stored even longer can be used advantageously without the setting quality being impaired.

A preferred exemplary embodiment of the method is characterized in that a filling date or production date is recorded at or on the fuel tank, preferably in an electronically and/or optically detectable or readable form. The filling date or production date can be recorded, for example, in a so-called RFID (radio frequency identification) or in a barcode.

A further preferred exemplary embodiment of the method is characterized in that the filling date or production date of the fuel tank is detected or read in the setting device. The filling date or production date of the fuel tank is, for example, detected or read by a suitable reading device when the fuel tank is used, when the setting device is implemented and/or before a setting operation.

A further preferred exemplary embodiment of the method is characterized in that the age of the fuel tank is determined before a metering operation or setting operation. From the age of the fuel tank it can be estimated how great a pressure reduction or pressure drop is in the interior of the fuel tank at a current time. From this it is possible to draw a conclusion relatively precisely as to the actual pressure in the fuel tank.

A further preferred exemplary embodiment of the method is characterized in that the age of the fuel tank is determined from the filling date or production date of the fuel tank and a real time. The age of the fuel tank is obtained in a simple manner from the difference between the real time and the filling date or production date.

A further preferred exemplary embodiment of the method is characterized in that the real time is detected by a real time clock in the setting device. The real time clock may, for example, be combined with a control device in the setting device.

A further preferred exemplary embodiment of the method is characterized in that the filling date or production date of the fuel tank is read by a reading unit in the setting device. The filling date or production date of the fuel tank can be read once only, for example during use of the fuel tank in the setting device. However, the filling date or production date of the fuel tank can also be read with each implementation of the setting device. Alternatively, the filling date or production date of the fuel tank can also be read before each setting operation. This results in increased precision in the determination of the age of the fuel tank.

A further preferred exemplary embodiment of the method is characterized in that an average pressure drop in the fuel tank is estimated with the age of the fuel tank. The progression of the average pressure drop in the fuel tank can be assumed to be constant. If appropriate, characteristic curves or characteristic fields can also be employed in which the average pressure drop in the fuel tank has been determined by studies or experiments for a specific fuel tank type.

In a system for controlling injection processes in liquid fuel-operated setting devices which comprise a fuel tank from which fuel is supplied to a combustion chamber by means of a time-controlled metering device, in particular according to a previously described method, the object set out above can be achieved alternatively or additionally by at least one or more of the following features: The filling date or production date of the fuel tank is stated at or on the fuel tank; the setting device comprises a real time clock; the setting device comprises a reading unit; the setting device comprises a controller which is connected for control purposes to the real time clock and the reading unit. Furthermore, the setting device comprises a computer program product with a program code for carrying out the previously described method, in particular if the program is executed in the controller of the setting device.

Furthermore, the invention relates to a computer program product with a program code for carrying out the previously described method, in particular if the program is executed in the controller of the setting device.

The invention also relates, if appropriate, to a setting device and/or a fuel tank for a previously described system. The setting device and the fuel tank can be dealt with separately.

The setting device is a setting device for setting fastening elements, such as bolts. Therefore such a setting device is also designated as a bolt setting device. The setting device is preferably designed as a hand-held setting device. The setting device is operated with gas as fuel. The fuel tank is preferably a gas canister or gas cartridge which is inserted into the setting device.

Further advantages, features and details of the invention are apparent from the following description in which various embodiments of the invention are described in detail with reference to the drawing.

BRIEF DESCRIPTION OF THE SEVERAL VIEWS OF THE DRAWING(S)

FIG. 1 shows a simplified representation of a setting device.

DETAILED DESCRIPTION OF THE INVENTION

In FIG. 1 a setting device 1 with a housing 2 is illustrated in highly simplified form. The housing 2 comprises a handle 4, on which the setting device 1 can be mounted for driving in a fastening element, wherein the setting device projects from the setting device 1 at a setting end 5 and can be driven into a substrate.

The fastening elements used are preferably provided by means of a magazine 6 which is located inside the device and is mounted in the vicinity of the setting end 5 of the setting device 1. The fastening elements are automatically withdrawn, preferably individually, from the magazine 6 and are provided at the setting end 5.

Energy required for driving the fastening elements into the substrate is provided in a fuel tank 8 in the interior of the setting device 1 The fuel in the fuel tank 8 is a liquid gas. Therefore the fuel tank 8 is also designated as a gas canister or gas cartridge.

The fuel tank 8 can be connected by means of an adjustable or regulable metering device 10 and a connecting line 11 to a combustion chamber or a combustion zone 12. The metering device 10 is preferably designed as a metering valve.

In the combustion zone or the combustion chamber 12, fuel, that is to say gas, from the fuel tank 8 is mixed with air to produce a combustible mixture which is ignited by an ignition device 14 in order to drive a fastening element, such as a bolt or a nail, into the substrate. When a trigger 16 of the setting device 1 is actuated by means of a piston (not shown), the energy required for driving in is transmitted from the combustion chamber 12 to a fastening element at the setting end 5. A fan (not shown) can be arranged in the combustion chamber 12 in order to generate turbulence in the combustion chamber 12, to flush and/or to cool the combustion chamber 12. The fan is driven, for example, by an electric motor (likewise not shown).

For control purposes a controller or control unit 20 is arranged in the setting device 1. An ignition cable 19 extends from the controller 20 to the ignition device 14 in the combustion chamber 12. By means of the ignition cable 19 the ignitable mixture in the combustion zone 12 is ignited with the aid of the ignition device 14.

According to one aspect of the invention the filling date 24 is recorded on the fuel tank 8. The filling date 24 of the fuel tank 8 can be read with a reading unit 25 which is integrated in the controller 20.

Furthermore, a real time clock 28 is integrated in the controller 20. The real time clock 28 measures the time continuously, even when the setting device 1 is switched off. Thus by means of the real time clock 28 the current time can be retrieved during operation of the setting device 1.

A fundamental idea of the invention is based on an estimation of a pressure drop in the fuel tank 8. The storage time or the age of the fuel tank 8 is used in order to estimate the pressure drop.

An average pressure drop in the fuel tank 8 can be estimated in a simple manner from the filling date 24 of the fuel tank 8 and the current time or the current date registered by the real time clock 28. According to a further feature of the invention the pressure in the fuel tank 8 is not assumed to be constant, but is corrected with the aid of the estimated average pressure drop.

The age-related pressure drop in the fuel tank 8 leads to a lower mass flow during the metering. By the adaptation of the metering time according to the invention the metered quantity can be kept constant in spite of a reduced mass flow as a consequence of the pressure drop in the fuel tank 8.

Particularly advantageously, the invention enables the use of fuel tanks 8 in which a significant pressure drop occurs in the interior due to aging. A significant pressure drop can occur, for example, in fuel tanks which have a bag in the interior to accommodate the gas or of the fuel.

Such fuel tanks can be used in the system according to the invention, in particular in the setting device 1 according to the invention, without malfunctions, and in particular without the quality of the settings being impaired. Moreover, due to the invention the duration of the usability or service life of fuel tanks, in particular fuel tanks in which the pressure drops significantly with age or with the storage time, can be substantially increased, for example from one year to two years.

The invention claimed is:

1. A method for controlling injection processes in a liquid fuel-operated setting device comprising a fuel tank from which fuel is supplied to a combustion chamber by a time-controlled metering device, the method comprising
   metering a quantity of fuel by setting a metering time interval of the time-controlled metering device;
   supplying the metered quantity of fuel to the combustion chamber; and,
   adapting the metering time interval of the time-controlled metering device to an age of the fuel tank.

2. The method according to claim 1, comprising recording a filling date or a production date at or on the fuel tank.

3. The method according to claim 2, comprising detecting or reading the filling date or the production date of the fuel tank in the setting device.

4. The method according to claim 3, comprising determining the age of the fuel tank before a metering operation or a setting operation.

5. The method according to claim 3, comprising determining the age of the fuel tank from the filling date or the production date of the fuel tank and a real time.

6. The method according to claim 5, comprising detecting the real time by a real time clock in the setting device.

7. The method according to claim 3, comprising detecting or reading the filling date or the production date of the fuel tank by a reading unit in the setting device.

8. The method according to claim 2, comprising determining the age of the fuel tank before a metering operation or a setting operation.

9. The method according to claim 8, comprising determining the age of the fuel tank from the filling date or the production date of the fuel tank and a real time.

10. The method according to claim 9, comprising detecting the real time by a real time clock in the setting device.

11. The method according to claim 2, comprising determining the age of the fuel tank from the filling date or the production date of the fuel tank and a real time.

12. The method according to claim 11, comprising detecting the real time by a real time clock in the setting device.

13. The method according to claim 2, comprising detecting or reading the filling date or the production date of the fuel tank by a reading unit in the setting device.

14. The method of claim 2, comprising recording the filling date and/or the production date in electronic form.

15. The method of claim 14, comprising recording the filling date and/or the production date in optically detectable or readable form.

16. The method of claim 2, comprising recording the filling date and/or the production date in optically detectable or readable form.

17. The method according to claim 1, comprising estimating an average pressure drop in the fuel tank with the age of the fuel tank.

18. A system for controlling injection processes in a liquid fuel-operated setting device comprising a fuel tank from which fuel is supplied to a combustion chamber by a time-controlled metering device for use in the method according to claim 1, comprising one or more of:
   a filling date or a production date of the fuel tank stated at or on the fuel tank;
   the setting device comprises a real time clock;
   the setting device comprises a reading unit;
   the setting device comprises a controller connected to a real time clock and a reading unit;
   the setting device comprises a computer program product with a program code for carrying out the method.

19. A setting device and/or fuel tank for the system according to claim 18.

* * * * *